United States Patent
Yoda (10) Patent No.: US 6,595,656 B2
(45) Date of Patent: Jul. 22, 2003

(54) CABIN LAMP

(75) Inventor: Takashi Yoda, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/976,689

(22) Filed: Oct. 12, 2001

(65) Prior Publication Data

US 2002/0145871 A1 Oct. 10, 2002

(30) Foreign Application Priority Data

Oct. 13, 2000 (JP) ......................................... 2000-313785

(51) Int. Cl.[7] .................................................. F21L 4/00
(52) U.S. Cl. ........................ 362/187; 362/488; 362/489; 362/490; 362/544; 362/545; 362/237; 362/240; 362/241; 362/244; 362/246; 362/247; 362/249
(58) Field of Search ................................ 362/187, 488, 362/489, 490, 544, 545, 237, 240, 241, 244, 246, 249; 439/332, 337, 616, 671

(56) References Cited

U.S. PATENT DOCUMENTS

| 4,550,967 A | * | 11/1985 | Riches et al. ................ 439/332 |
| 4,733,335 A | * | 3/1988 | Serizawa et al. ........... 362/373 |
| 5,548,498 A | * | 8/1996 | Murakami ................... 362/309 |
| 5,580,156 A | | 12/1996 | Suzuki et al. |
| 5,797,672 A | * | 8/1998 | Dobert ........................ 362/190 |
| 6,435,691 B1 | * | 8/2002 | Macey et al. ................ 362/101 |

* cited by examiner

Primary Examiner—Sandra O'Shea
Assistant Examiner—Mark Tsidulko
(74) Attorney, Agent, or Firm—Koda & Androlia (57) ABSTRACT

A cabin lamp used in, for instance, an airplane having an LED module that is attached to a lamp housing and connected via a connector to a feeder element provided in the lamp housing. The LED module has a printed circuit board and a plurality of reflectors that are installed in a frame-shaped bezel detachably attached to a front end portion of the lamp housing. The printed circuit board is mounted with a plurality of light emitting diodes (LEDs), and the reflectors surround each of the LEDs so as to reflect the light from the LEDs substantially forward.

4 Claims, 6 Drawing Sheets

CABIN LAMP

BACKGROUND OF THE INVENTION

1. Field of the Invention

The present invention relates to a cabin lamp and more particularly to a cabin lamp that has a longer useful life, generates less heat and is suitable as a reading lamp for airplanes and automobiles.

2. Prior Art

Figure 5:
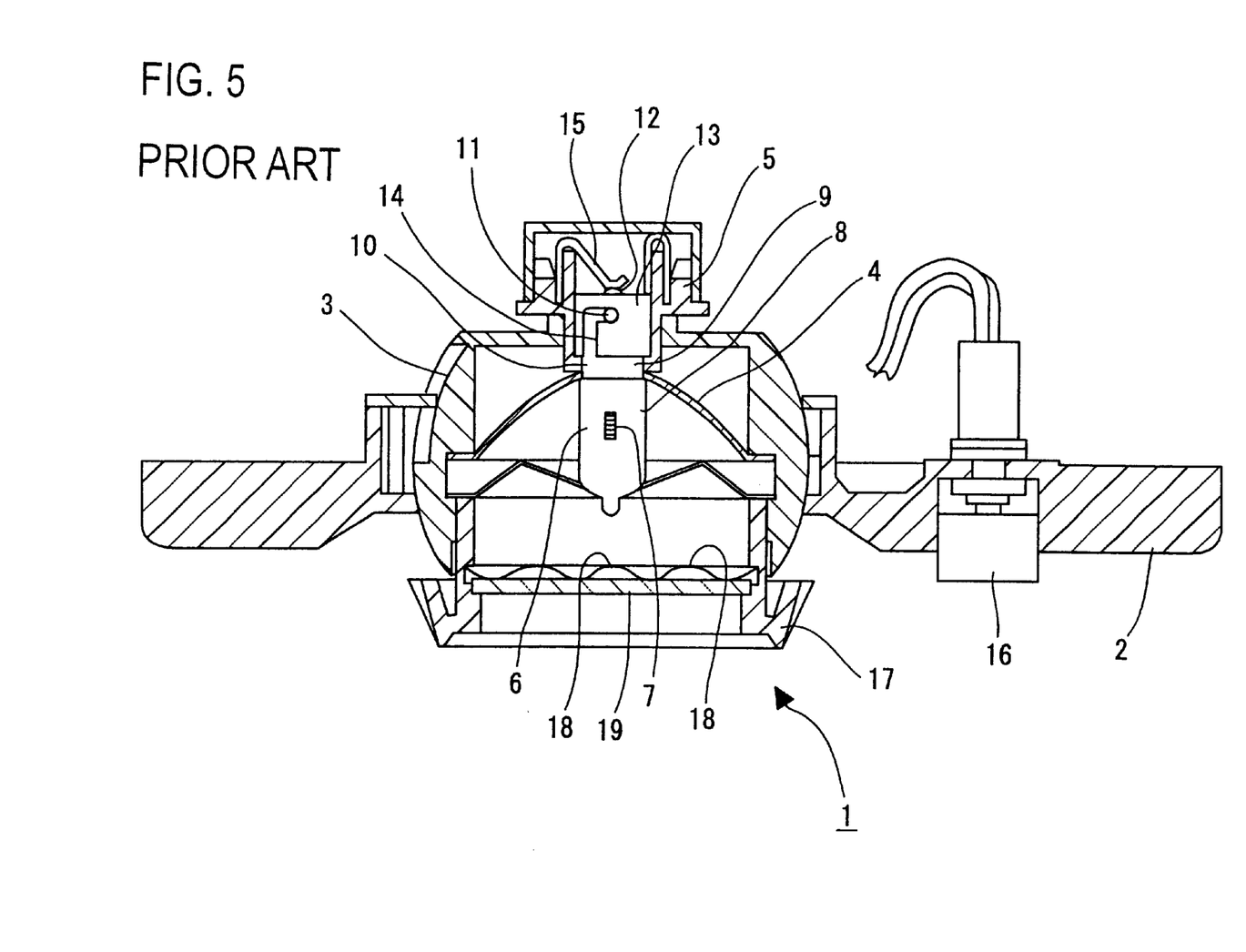
FIG. 5 shows in cross section an example of a conventional cabin lamp.

FIG. 5 shows one example of a conventional cabin lamp. The cabin lamp 1 is, for example, a reading lamp for an airplane.

The cabin lamp 1 is supported by a panel 2 so as to be rotatable in a predetermined angle range about its axis.

A lamp housing 3 of the cabin lamp 1 has a spherical external side surface and is rotatably supported by the panel 2. A reflector 4 is installed in the lamp housing 3. A lamp socket 5 is detachably mounted to the rear end portion of the lamp housing 3, and an incandescent bulb 6 is detachably mounted to the lamp socket 5.

The incandescent bulb 6 is of a type in which a cylindrical cap 9 is mounted to one end of a glass bulb 8 having a filament 7 sealed therein. Connector pins 11 (only one pin is shown in FIG. 5) protrude from the side surface of a cylindrical element 10 of the cap 9 made of conductive metal, and a feeder terminal 12 insulated with respect to the cylindrical element is disposed at one end of the cylindrical element 10.

A cylindrical holder 13 made of conductive metal is disposed inside the lamp socket 5, and the so-called J-shaped slots 14 (only one slot is shown) are formed in the holder 13. Further, a flexible feeder contact 15 is disposed on the lamp socket 5. The feeder contact 15 is connected to the power source through a switch 16 provided in the panel 2. The holder 13 is grounded.

The connector pins 11 of the cap 9 of the incandescent bulb 6 are guided along the J-shaped slots 14 of the holder 13 of the lamp socket 5 and received in the holder 13; and when the connector pins 11 are rotated along the bent portions of the J-shaped slots 14, the feeder contact 15 of the lamp socket 5 elastically contacts the feeder terminal 12, causing the connector pins 11 to be supported by the bent portions of the J-shaped slots 14. The incandescent bulb 6 is thus held in the lamp socket 5.

Furthermore, an annular bezel 17 is detachably fitted to the front end of the lamp housing 3 of the cabin lamp 1. A lens 19 having minute fisheye steps 18 formed on its inner surface is fitted to the bezel 17.

In the structure above, when the switch 16 is switched to the ON side, the feeder terminal 12 of the incandescent bulb 6 is connected to the power source through the switch 16 and the feeder contact 15 of the lamp socket 5. Further, since the cylindrical element 10 of the cap 9 is grounded through the connector pins 11 and the holder 13 of the lamp socket 5, electricity is supplied to the filament 7 and the lamp is lit.

In the above-described cabin lamp 1, the light source is an incandescent bulb and the internal volume is small. Accordingly, temperatures of the lamp housing 3 and bezel 17 tend to become high. This would raise the cabin temperature or give a user a burn when he/she touches the bezel 17 for adjustment of the illumination position.

Also, the life of incandescent bulbs is relatively short; and as a result, it is necessary to replace the incandescent bulb 6 frequently.

Figure 6:
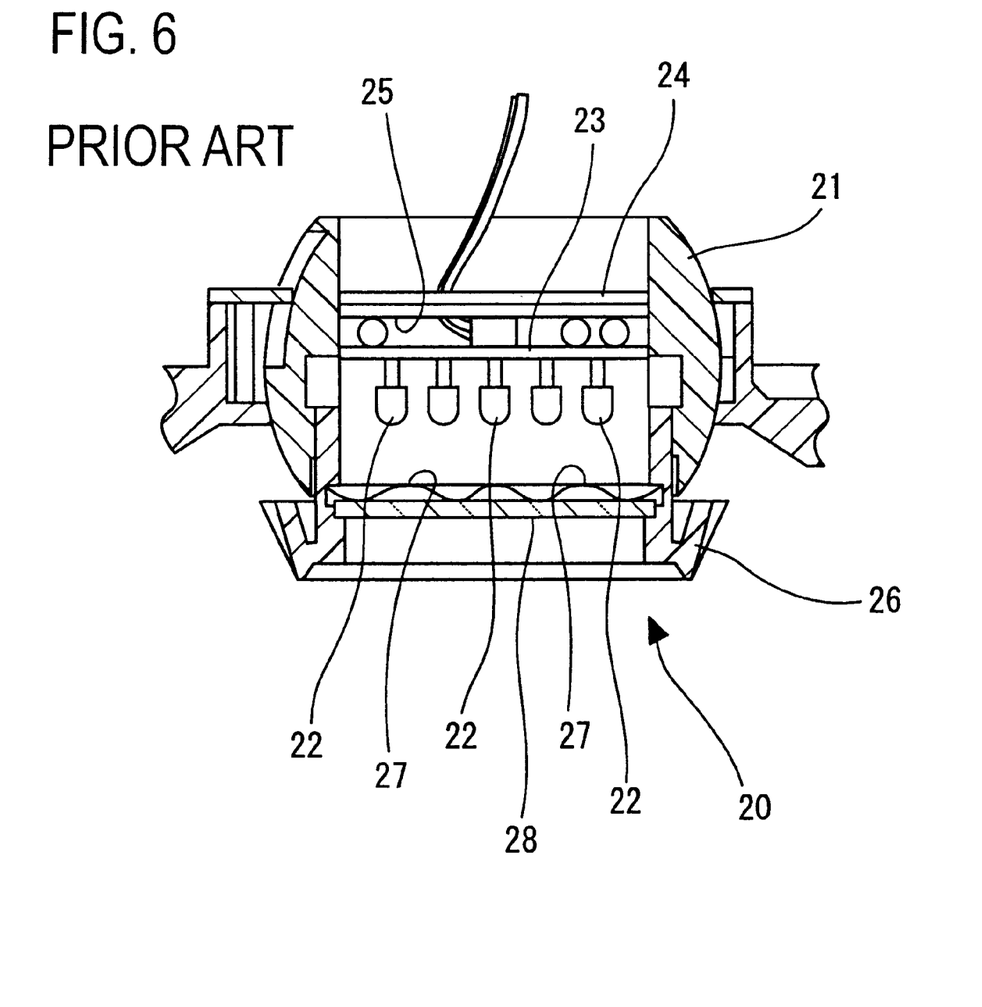
FIG. 6 shows in cross section another example of a conventional cabin lamp.

FIG. 6 shows a cabin lamp 20 that uses a light emitting diode (LED) as the light source. This type of lamp is proposed for the purpose of solving the problem that occurs when incandescent bulbs are used as the light source as described above.

The cabin lamp 20 is also for a reading lamp of an airplane, and it is supported by a panel (not shown) so as to be rotatable in a predetermined angle range.

A printed circuit board 23 with a plurality of LEDs 22 mounted thereon is installed in a lamp housing 21 that is rotatably supported by the panel. A heat sink 24 is also installed in the lamp housing 21. The heat sink 24 is installed on the backside of the printed circuit board 23. A heat radiation rubber 25 is laminated on the surface of the heat sink 24 that faces the printed circuit board 23.

An annular bezel 26 is detachably mounted to the front end of the lamp housing 21. A lens 28 having minute fisheye steps 27 formed on the inner surface thereof is fitted to the bezel 26.

In the above cabin lamp 20, generated heat is small because the light source is the LED 22. Accordingly, the problem of temperature inside the cabin becoming high or the problem of a user getting burn is solved. Further, since the life of LEDs is longer than incandescent bulbs, there is an advantage to use LEDs that the light source does not need to be replaced frequently.

However, with the above-described cabin lamp 20, since the printed circuit board 23 having the LEDs 22 thereon is fitted to the lamp housing 21, the entire lamp including the lamp housing 21 needs to be replaced when a cabin lamp having an incandescent bulb as the light source is to be replaced with a cabin lamp having the LEDs 22 as the light source. This presents a cost problem.

Further, the new cabin lamp 20 with LEDs must be installed in the panel 2 after the old cabin lamp 1 with an incandescent bulb is removed from the panel 2. The problem is that the replacement work takes time and man power.

SUMMARY OF THE INVENTION

Therefore, it is an object of the present invention to provide a new cabin lamp that has a longer useful life and generates a small amount of heat by using an LED as the light source.

It is another object of the present invention to provide a cabin lamp that has a good interchangeability with a cabin lamp that has an incandescent bulb as the light source.

The above objects are accomplished by a unique structure for a cabin lamp of the present invention, wherein an LED module, in which a printed circuit board on which a plurality of LEDs are disposed and a plurality of reflectors that surround the LEDs separately so as to reflect the light from the LED substantially forward are mounted to a frame-shaped bezel, is detachably attached to a front end portion of a lamp housing, and wherein the LED module is connected through a connector to a feeder element provided in the lamp housing.

The thus structured cabin lamp of the invention has a longer useful life and small heat generation because the LED is used as the light source.

Further, in the present invention, the light source portion is modularized. Accordingly, when changing the light source from the incandescent bulb to LED, only the bezel of the cabin lamp having the incandescent bulb needs to be removed, and then the LED module is instead installed. Accordingly, the replacement can be done easily and quickly.

DETAILED DESCRIPTION OF THE INVENTION

Embodiments of the cabin lamp of the present invention will be described below with reference to the accompanying drawings. A reading lamp used in an airplane is described below as the embodiments of the present invention.

Figure 1:
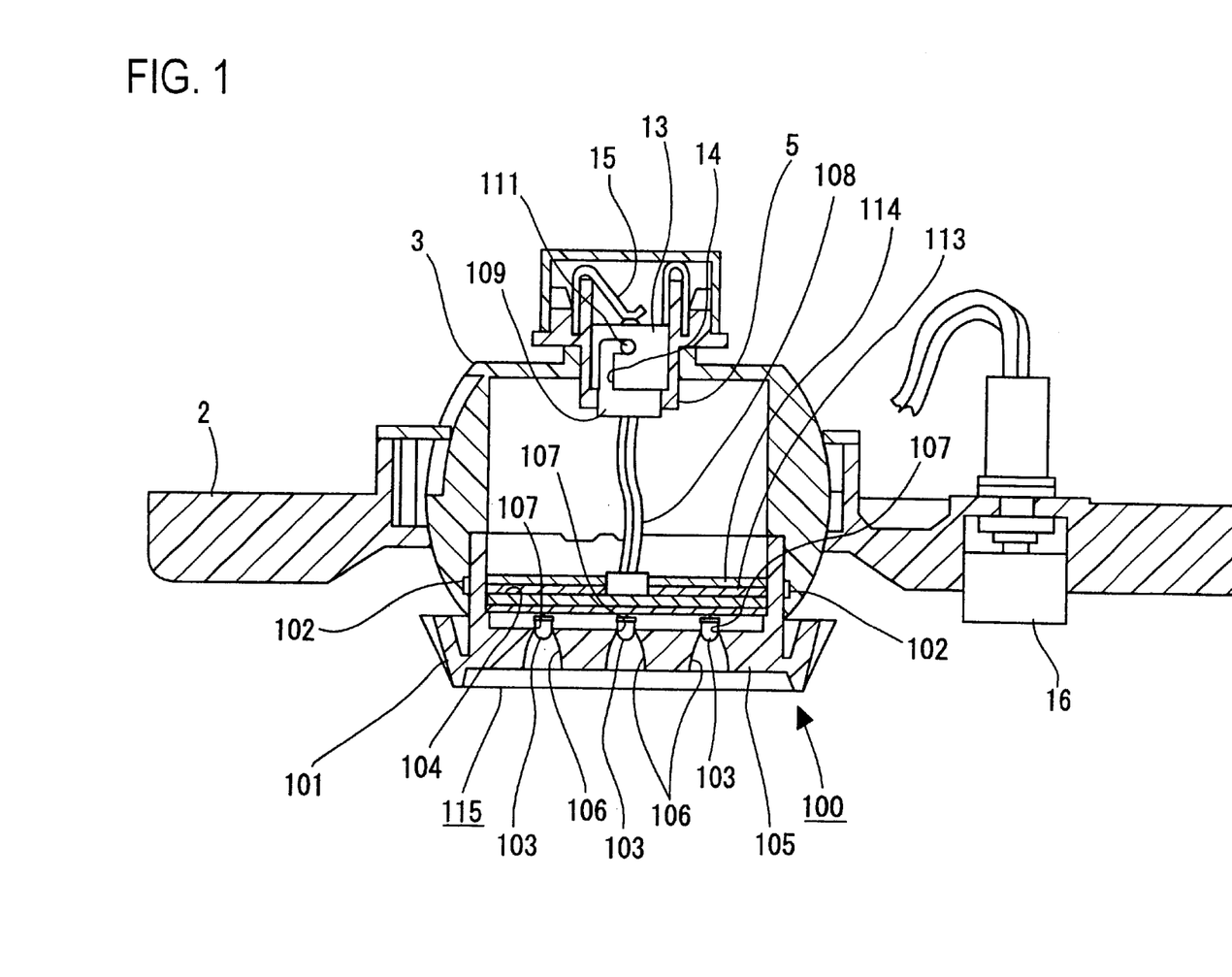
FIG. 1 shows in cross section the first embodiment of the cabin lamp according to the present invention.

A cabin lamp generally referred to by the reference numeral 100 is supported by a panel 2 installed on a cabin wall surface of an airplane so that the cabin lamp 100 is rotatable in a predetermined angle range (see FIG. 1).

The lamp housing 3 having a spherical external side surface is rotatably installed in the panel 2. The lamp socket 5 is detachably mounted to the rear end of the lamp housing 3 (see FIG. 1).

Figure 2:
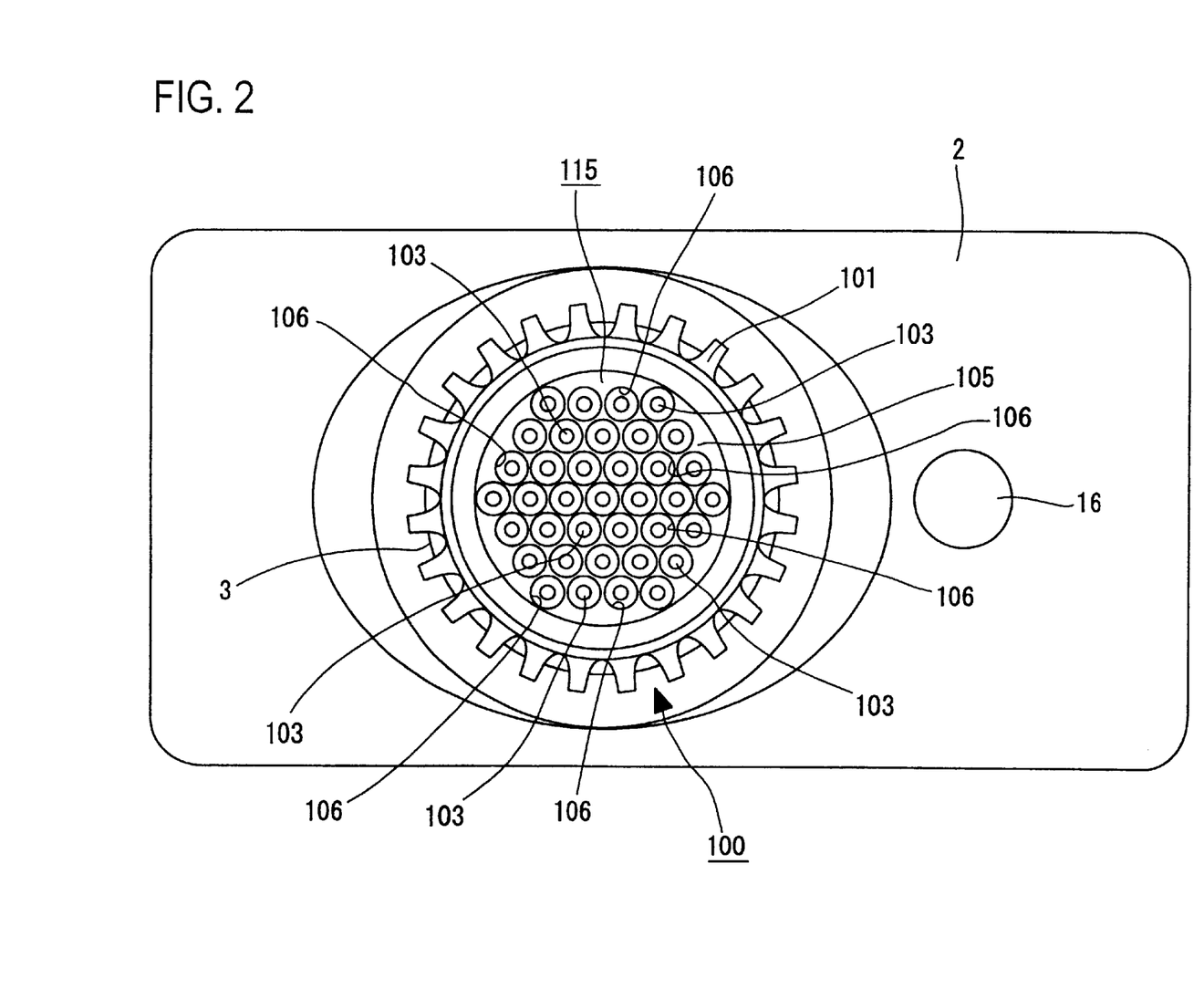
FIG. 2 is a front view of the cabin lamp.

A cylindrical holder 13 made of conductive metal is disposed inside the lamp socket 5, and the so-called J-shaped slots 14 (only one slot is shown) acre formed in the holder 13. A flexible feeder contact 15 is disposed on the lamp socket 5. The feeder contact 15 is connected to a power source (not shown) through a switch 16 provided in the panel 2. The holder 13 is grounded (see FIGS. 1 and 2).

Figure 3:
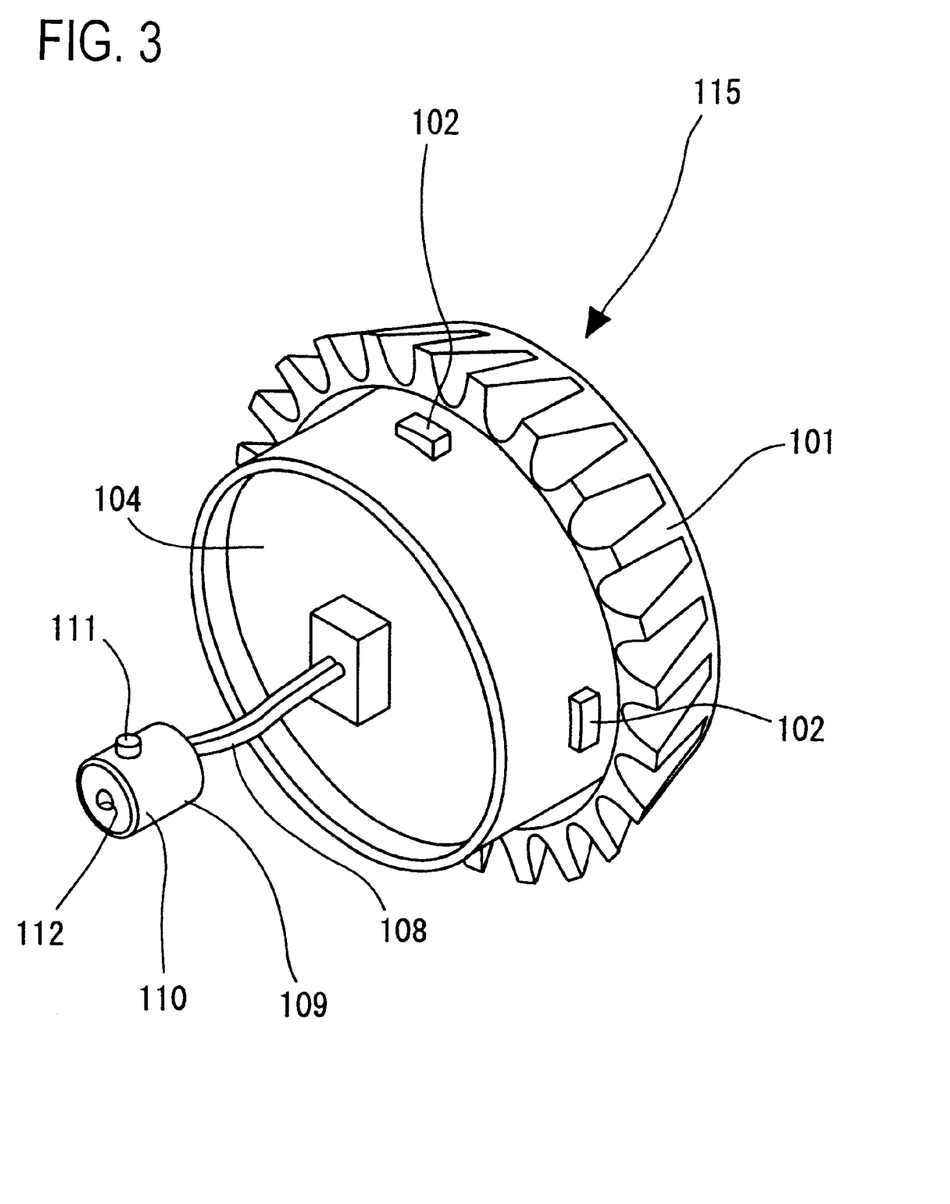
FIG. 3 is a perspective view of the LED module used in the cabin lamp as seen from the rear side.

A substantially annular bezel 101 is detachably mounted to the front end portion of the lamp housing 3 (see FIG. 1). As seen from FIG. 3, the bezel 101 has substantially a cylindrical shape with a short axial length. On an outer peripheral surface thereof, four engagement protrusions 102 (only two are shown in FIG. 3) are formed at substantially equal intervals in the circumferential direction.

On an inner surface of the lamp housing 3, four L-shaped slots (not shown) are formed at equal intervals in the circumferential direction. The L-shaped slot includes a vertical portion extending from a front end of the inner surface of the lamp housing 3 to a mid position thereof and a horizontal portion that extends from a rear end of the vertical portion toward the side in the same direction.

A printed circuit board 104 having a plurality of LEDs 103 mounted thereon is installed in the bezel 101. A reflector unit 105 is also installed in the bezel 101 so that the reflector unit 105 is located on a front side of the printed circuit board 104. A plurality of reflector concave portions 106 are formed in the reflector unit 105 so as to correspond to the LEDs 103. The inner surfaces of the reflector concave portions 106 are formed as reflecting surfaces so as to serve as reflectors. Openings 107 that reach the rear end are formed in the reflector concave portion 106. Through the openings 107, the LEDs 103 mounted on the printed circuit board 104 are set at predetermined locations in the reflector concave portions 106 (see FIG. 1).

The reflector unit 105 is obtained by, for example, forming the reflector concave portions 106 in a thick aluminum sheet and then polishing the inner surface of the reflector concave portions 106. Instead, the reflector unit 105 may also be formed as a reflector surface by first molding synthetic resin and then vaporizing aluminum on the inner surface of the reflector concave portions 106.

In either case, the reflector unit 105 and the bezel 101 can be formed integrally. In the embodiment of FIG. 1, the reflector unit 105 is shown in a state integrally formed with the bezel 101.

A connector 109 is connected at a tip end of a cord 108 for feeding electricity to the LEDs 103 led out from a back surface of the printed circuit board 104. The connector 109 has, on the external side surface of the cylindrical element 110 made of conductive metal, connector pins 111 protruding therefrom. The connector 109 is in a form of a cap of bulb, and a feeder terminal 112 insulated with respect to the cylindrical element 110 is provided at one end of the cylindrical element 110 (see FIGS. 1 and 3).

In the bezel 101, a heat sink 114 having a heat radiation rubber 113 functioning also as an insulating material adhered thereon is provided. The heat sink 114 is provided so as to face the printed circuit board 104 and to be near the back surface of the printed circuit board 104 (see FIG. 1).

As seen from the above, by way of installing the printed circuit board 104 having the LEDs 103 thereon and the reflector unit 105, etc. in the bezel 101 that is detachable to the lamp housing 3, an LED module 115 is obtained. The thus obtained LED module 115 is attached to the lamp housing 3.

In other words, the connector 109 is connected to the lamp socket 5, and then the bezel 101 is attached to the lamp housing 3.

More specifically, the connector pins 111 of the cylindrical element 110 of the connector 109 are guided along the J-shaped slots 14 of the holder 13 of the lamp socket 5 until they are received in the holder 13, then the connector pins 111 are rotated along the bent portions of the J-shaped slots 14 so that the feeder contact 15 of the lamp socket 5 elastically contacts the feeder terminal 112. As a result, the connector pins 111 are held by the bent portions of the J-shaped slots 14, and the connector 109 is thus combined to the lamp socket 5.

Next, the bezel 101 is inserted into the lamp housing 3 by way of having the engagement protrusions 102 of the bezel 101 run along the vertical portions of the L-shaped slots of the lamp housing 3, and the bezel 101 is rotated when the engagement protrusions 102 reach the rear ends of the vertical portions of the L-shaped slots, so that the engagement protrusions 102 engage with the horizontal portions of the L-shaped slots.

The bezel 101 is thus attached to the lamp housing 3.

In the manner described above, the LED module 115 is connected to the lamp housing 3.

When the switch 16 is switched to the ON side, the feeder terminal 112 of the connector 109 is connected to the power source through the switch 16 and the feeder contact 15 of the lamp socket 5; also, since the cylindrical element 110 of the connector 109 is grounded through the connector pins 111 and the holder 13 of the lamp socket 5, electricity is supplied to the LEDs 103, and the LED 103 light.

In the above cabin lamp 100, the light source is the LED 103. Accordingly, heat generated is small, and it would not happen that the heat increases the temperature inside the cabin or burns a person who touches the lamp 100. Also, the cabin lamp 100 has a longer useful life.

Furthermore, the light source portion of the cabin lamp 100 is modularized. Accordingly, in the case of changing the light source from an incandescent bulb to an LED, the bezel of the cabin lamp having an incandescent bulb only needs to be removed and replaced by the LED module. Thus, the replacement is done easily and quickly.

Figure 4:
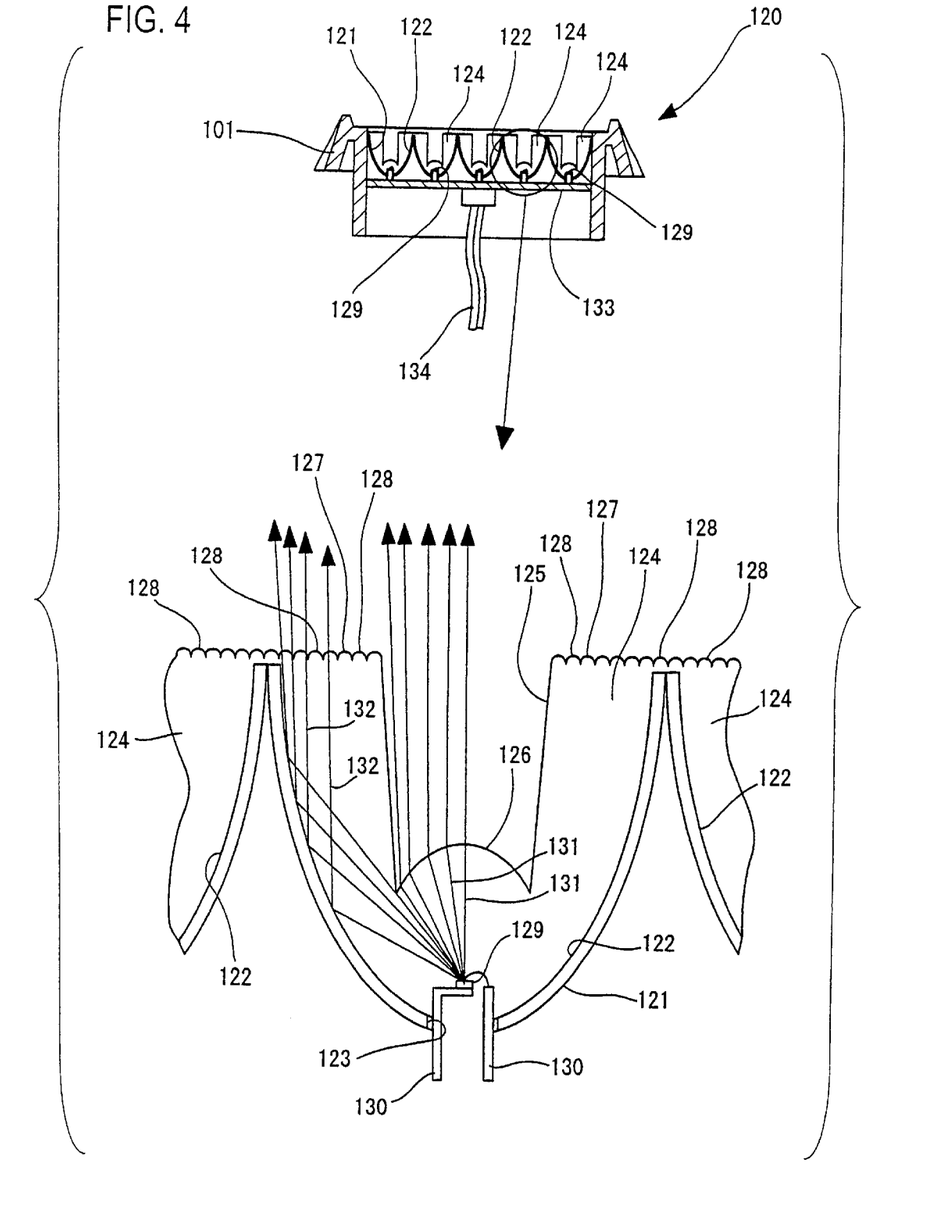
FIG. 4 shows the essential portion of a second embodiment of the cabin lamp according to the present invention.

FIG. 4 shows the second embodiment of the cabin lamp of the present invention. The second embodiment differs from the first embodiment in terms of only the LED module, and the other elements are the same as those in the first embodiment. Accordingly, FIG. 4 shows only the LED module 120 of the second embodiment.

The feature of the second embodiment is that the reflector unit and the LED are integrated.

As in the first embodiment, a reflector unit 121 of the second embodiment is fixed to the bezel 101. The reflector unit 121 is provided with a plurality of integrally formed reflector concave portions 122. The reflector unit 121 is formed by, for instance, stamping an aluminum sheet or molding synthetic resin.

In any case, the inner surfaces of the reflector concave portions 122 need to be reflective. Consequently, when forming by stamping aluminum sheets, the surface which becomes the inner surfaces of the reflector concave portions 122 is polished; and when forming by molding synthetic resin, reflective surfaces are formed on the inner surfaces of the reflector concave portions 122 by aluminum deposition or the like after molding. It is also advisable to form synthetic resin 124 in a reflector shape in advance and then form the reflective surface by depositing aluminum from the reverse surface. Openings 123 are formed on the rear ends of the reflector concave portions 122.

Transparent synthetic resins 124 are filled in the respective reflector concave portions 122. The transparent synthetic resins 124 include, for example, epoxy resin. A columnar recess portion 125 is formed at the center of the transparent synthetic resin 124, and a bottom surface of the recess portion 125 is made to be a condenser portion 126 that is convex toward the front. An area 127 of a front surface of the transparent synthetic resin 124 that is located around the recess portion 125 is formed with minute fisheye steps 128 of, for example, approximately 1.0 mm in diameter over an entire surface thereof.

At a rear end portion of each one of the transparent synthetic resins 124, that is, at a portion in the periphery of the opening 123 of each one of the reflector concave portions 122, an LED chip 129 is embedded. A lead frame 130 connected to the LED chip 129 is protruded from the rear end of each one of the transparent synthetic resins 124 through the opening 123 of the reflector concave portions 122.

The condenser portion 126 is formed within a range which the direct light rays 131 from the LED chip 129, that is, the light rays not reflected by the inner surface of the reflector concave portion 122, reach. The reflected light rays 132 emitted from the LED chip 129 and reflected by the inner surface of the reflector concave portion 122 are transmitted through the peripheral area 127. For example, if the diameter of the opening of the reflector concave portion 122 is 8.0 mm, then the diameter of the opening of the recess portion 125 would be approximately 3.0 mm.

In the above embodiment, the respective transparent synthetic resins 124 are integrally formed; however, the respective synthetic resins 124 may be formed independently. Nonetheless, the strength of the LED module 120 is higher and the work of filling the transparent synthetic resins 124 in the reflector concave portions 122 is more facilitated if all the transparent synthetic resins 124 are integrated.

A printed circuit board 133 is disposed so as to be in contact with a back surface of the reflector unit 121, and the lead frames 130 are soldered to terminal portions formed on the printed circuit board 133.

A feeder terminal and a ground terminal of the printed circuit board 133 are connected to the connector 109 through a cord 134. The connector 109 is then connected to the lamp socket 5 attached to the lamp housing 3 shown in the first embodiment.

In the second embodiment, of the light emitted from the LED chips 129, the direct light rays 131 are condensed by the condenser portions 126 of the transparent synthetic resins 124 and form a spot light, and the light rays 132 reflected by the surface of the reflective concave portions 122 are diffused by the fisheye steps 128 of peripheral areas 127 and become diffused light, thus illuminating an area of, for example, approximately 50 cm in diameter at a position approximately 1.0 m from the front surface of the bezel 101 and thus being suitable for reading.

As seen from the above, since the light from the LED chips 129 can be controlled, illumination efficiency is improved and the number of LED chips 129 can be reduced, which contributes to cost reduction.

The shapes and structures of the respective elements shown and described in the above respective embodiments are only examples, and they should not be construed to limit the technical scope of the present invention.

As is clear from the above, in the cabin lamp of the present invention, an LED module is detachably attached to a front end portion of a lamp housing, and in this LED module, a printed circuit board on which a plurality of light emitting diodes (LEDs) are disposed and a plurality of reflectors that surround the LEDs separately so as to reflect the light from the LED substantially forward are mounted to a frame-shaped bezel; and further, the LED module is connected via a connector to a feeder element provided in the lamp housing.

Accordingly, the cabin lamp of the present invention generates a small amount of heat and has a longer useful life because it uses LEDs as the light source.

Since the light source portion is modularized, when changing the light source from an incandescent bulb to LED, only the bezel of the cabin lamp that is installed with the incandescent bulb needs to be removed and then the LED module is installed. Thus, the replacement is done easily and quickly.

Furthermore, in the present invention, the connector is shaped as a cap for a bulb in which connector pins are protruded from the external side surface of a cylindrical element made of conductive metal and a feeder terminal insulated with respect to the cylindrical element is disposed at one end of the cylindrical element. Accordingly, the lamp cabin lamp of the present invention has a good interchangeability with a cabin lamp that uses an incandescent bulb.

In addition, in the present invention, transparent synthetic resin is filled in the reflectors, a protruding condenser step is formed in a direct light ray region of the front surface of the transparent synthetic resin where light from the LED is directly projected, and a plurality of fisheye steps are formed in a reflected ray region where the light from the LED reaches after being reflected by the reflector. Accordingly, a desired light distribution is obtained by controlling the light from the LED by the condenser step and by controlling the reflected light by the fisheye steps. Thus, the present invention provides an improved illumination efficiency and uses the reduced number of LEDs; and also it is possible to contribute to cost reduction.

What is claimed is:

1. An LED module for replacing a cabin lamp having an incandescent bulb which is installed in a lamp housing, said LED module detachably attached to said lamp housing and electrically connected via an electrical connector to an electric feeder element for said incandescent bulb provided in said lamp housing, said LED module being comprised of:
   a frame-shaped bezel for detachably attaching said LED module to said lamp housing,
   a printed circuit board which is installed in said bezel and is provided thereon with a plurality of light emitting diodes (LEDs), and
   a plurality of reflectors which are installed in said bezel and surround said LEDs separately so as to reflect a light from each of said plurality of said LEDs substantially forward.

2. An LED module according to claim 1, wherein said electrical connector is shaped as a cap for an incandescent bulb and is comprised of:
   a cylindrical element made of conductive metal,
   connector pins protruding from an external side surface of said cylindrical element, and
   an electrical feeder terminal disposed at one end of said cylindrical element, said electrical feeder terminal being insulated with respect to said cylindrical element.

3. An LED module according to claim 1, wherein said plurality of reflectors are filled with transparent synthetic resin; and
   wherein protruding condenser steps are provided in direct light ray regions of a surface of said transparent synthetic resin where light from said LEDs is directly projected, and a plurality of fisheye steps are provided in a reflected ray region where light from said LEDs roach after being reflected by said reflectors.

4. An LED module according to claim 2, wherein said plurality of reflectors are fined with transparent synthetic resin; and wherein protruding condenser steps are provided in direct light ray regions of a surface of said transparent synthetic resin where light from said LEDs is directly projected, and a plurality of fisheye steps are provided in a reflected ray region where light from said LEDs reach alter being reflected by said reflectors.

* * * * *